United States Patent
Dawson

[19]

[11] Patent Number: 6,032,913
[45] Date of Patent: Mar. 7, 2000

[54] COMPUTER MOUSE SUPPORT SYSTEM

[76] Inventor: James E. Dawson, 307 Hickory La., Largo, Fla. 33770

[21] Appl. No.: 09/046,990

[22] Filed: Mar. 24, 1998

[51] Int. Cl.[7] ............................ B43L 15/00; A47B 91/00; A47B 23/00
[52] U.S. Cl. .................................. 248/346.01; 248/118.1; 108/43
[58] Field of Search .............................. 248/346.01, 118, 248/118.1, 118.3, 118.5, 718; 400/715; 108/43

[56] References Cited

U.S. PATENT DOCUMENTS

| 25,045 | 11/1859 | Clement | 248/118.5 |
|---|---|---|---|
| 89,142 | 4/1869 | Gorsline | 248/118.5 |
| 3,828,696 | 8/1974 | Lockridge | 108/43 |
| 4,052,944 | 10/1977 | Jennings | 108/43 |
| 4,700,634 | 10/1987 | Mills et al. | 108/43 |
| 5,005,702 | 4/1991 | Davis et al. | 206/562 |
| 5,081,936 | 1/1992 | Drieling | 108/43 |
| 5,090,334 | 2/1992 | Sutton | 108/43 |
| 5,165,630 | 11/1992 | Connor | 248/118.1 |
| 5,355,811 | 10/1994 | Brewer | 108/43 |
| 5,439,192 | 8/1995 | King | 248/118 |
| 5,460,102 | 10/1995 | Pasmanick | 108/43 |
| 5,472,161 | 12/1995 | Krukovsky | 248/918 |
| 5,593,128 | 1/1997 | Odom et al. | 248/918 |
| 5,664,673 | 9/1997 | Perry | 248/918 |
| 5,680,973 | 10/1997 | Vulpitta et al. | 224/153 |
| 5,732,910 | 3/1998 | Martin | 248/118 |
| 5,765,790 | 6/1998 | Kuldvere | 248/118 |
| 5,779,211 | 7/1998 | Bird | 248/918 |
| 5,820,968 | 10/1998 | Kurani | 428/137 |

*Primary Examiner*—Derek J. Berger
*Assistant Examiner*—Michael Nornberg

[57] ABSTRACT

A computer mouse support comprising a mouse-supporting pad in a generally rectangular configuration. The pad is formed of an upper component of a semi-rigid foam and constitutes about seventy percent of the thicknesses of the pad with an exposed upper surface adapted to receive a computer mouse and with a lower component of a soft foam secured to the lower surface of the upper component for constituting a resilient surface positionable on a user's lap or leg.

1 Claim, 3 Drawing Sheets

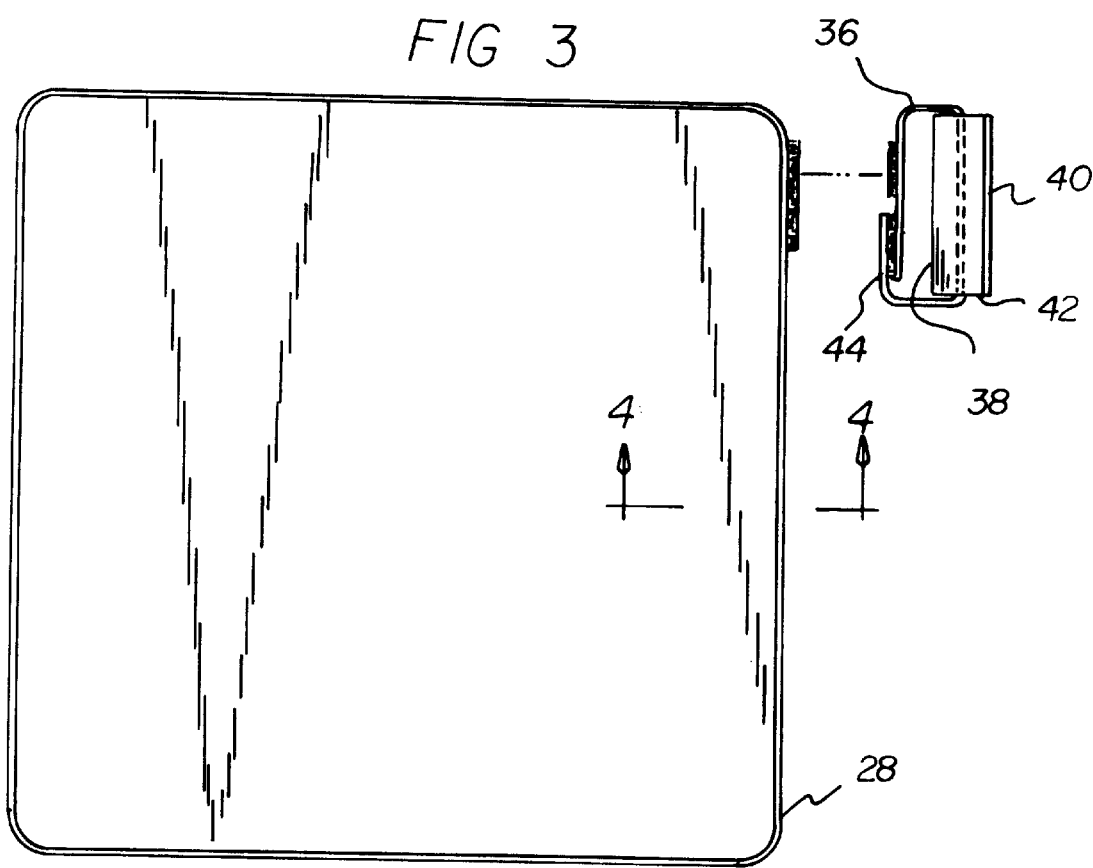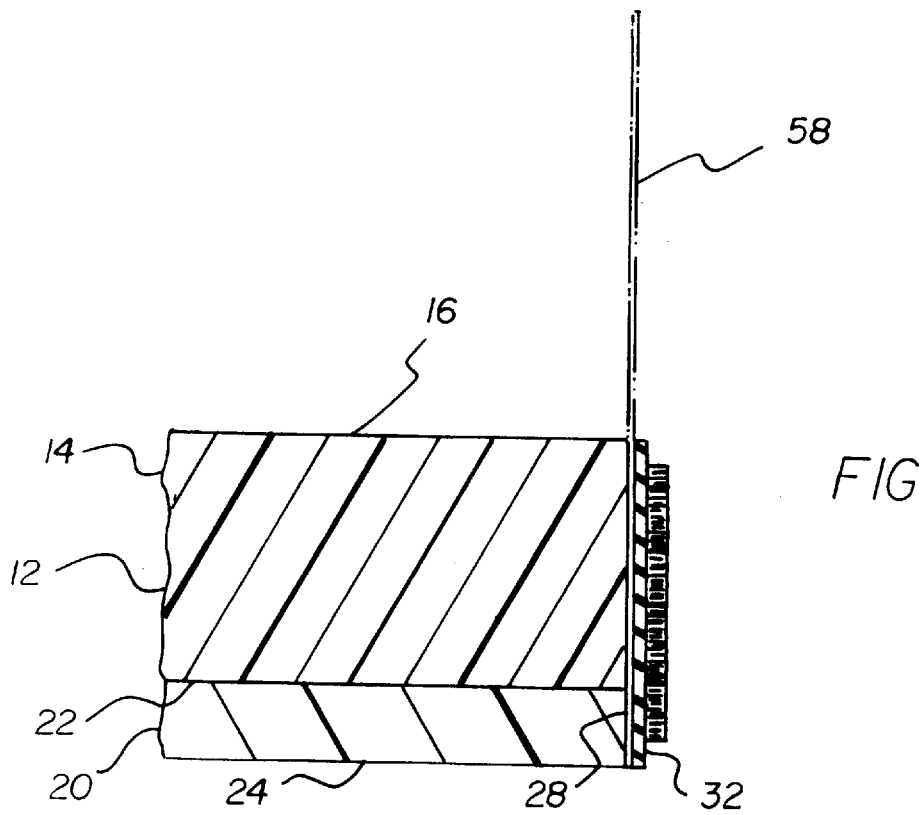

COMPUTER MOUSE SUPPORT SYSTEM

BACKGROUND OF THE INVENTION

1. Field of the Invention

The present invention relates to a computer mouse support system and more particularly pertains to providing a cushion with an upper surface adapted to receive and manipulate a computer mouse and a lower surface constituting a pillow positionable upon the lap or legs of a user.

2. Description of the Prior Art

The use of Computer accessories of known designs and configurations is known in the prior art. More specifically, Computer accessories of known designs and configurations heretofore devised and utilized for the purpose of facilitating the usage of computers through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. Des. 365,461 to Falter which discloses a Lap Desk.

U.S. Pat. No. Des. 354,636 to Cable discloses a Foldable Lap Desk.

U.S. Pat. No. 5,377,085 to Hermann et al. discloses an Enclosed Lighted Lap-Desk.

U.S. Pat. No. 5,348,263 to Hubbard discloses a Portable Expandable Lap Desk.

U.S. Pat. No. Des. 328,985 to Sheldon discloses a Portable Lap Desk.

U.S. Pat. No. Des. 315,456 to Couch et al. discloses a Lap desk.

U.S. Pat. No. 4,765,583 to Tenner et al discloses a Lap Desk.

U.S. Pat. No. Des. 287,741 to Taylor discloses a Toy Lap Desk.

U.S. Pat. No. Des. 280,216 to Boklund discloses a Child's Lap Desk and Blackboard.

U.S. Pat. No. 3,652,051 to McFarlane discloses a Foldable Lap Desk.

In this respect, the computer mouse support system according to the present invention substantially departs from the conventional concepts and designs of the prior art, and in so doing provides an apparatus primarily developed for the purpose of providing a cushion with an upper surface adapted to receive and manipulate a computer mouse or keyboard and a lower surface constituting a pillow positionable upon the lap or legs of a user.

Therefore, it can be appreciated that there exists a continuing need for a new and improved computer mouse support system which can be used for providing a cushion with an upper surface adapted to receive and manipulate a computer mouse and a lower surface constituting a pillow. In this regard, the present invention substantially fulfills this need.

SUMMARY OF THE INVENTION

In view of the foregoing disadvantages inherent in the known types of computer accessories of known designs and configurations now present in the prior art, the present invention provides an improved computer mouse support system. As such, the general purpose of the present invention, which will be described subsequently in greater detail, is to provide a new and improved computer mouse support system which has all the advantages of the prior art and none of the disadvantages.

To attain this, the present invention essentially comprises a new and improved computer mouse system having a mouse-supporting pad. The pad is in a generally rectangular configuration at about sixteen inches long on each side and about two inches in thickness. The pad is formed of an upper component of a semi-rigid foam and constituting about seventy percent of the thicknesses of the pad with an exposed upper surface adapted to receive a computer mouse and with a lower component of a soft foam secured to the lower surface of the upper component for constituting a resilient surface positionable on a user's lap or leg. A peripheral border is provided of an elastic material around the periphery of the pad. A patch of a pile-type fastener is secured to the pad adjacent one corner thereof. A wrist guard is in a generally rectangular configuration about three inches per side and a thickness of about one inch. The wrist guard has an interior surface which is positionable adjacent the carpal tunnel region of a user's wrist and an exterior surface with a sheet of a generally rigid polyvinyl chloride for sliding across the upper surface of the pad. The wrist guard has an elastic strap secured at its ends to opposite sides of the wrist guard and adapted to hold a user's wrist between the wrist guard and the strap. The strap has on outwardly facing patch of a pile-type fastener at a location remote from the pad for coupling with the pile-type fastener on the pad. The wrist guard is adapted to receive a computer mouse during non-usage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer mouse support system which has all the advantages of the prior art computer accessories of known designs and configurations and none of the disadvantages.

It is another object of the present invention to provide a new and improved computer mouse support system which may be easily and efficiently manufactured and marketed.

It is a further object of the present invention to provide a new and improved computer mouse support system which is of a durable and reliable construction.

An even further object of the present invention is to provide a new and improved computer mouse support system which is susceptible of a low cost of manufacture with regard to both materials and labor, and which accordingly is then susceptible of low prices of sale to the consuming public, thereby making such computer mouse support system economically available to the buying public.

Still yet another object of the present invention is to provide a new and improved computer mouse support system which provides in the apparatuses and methods of the prior art some of the advantages thereof, while simultaneously overcoming some of the disadvantages normally associated therewith.

Still another object of the present invention is to Providing a cushion with an upper surface adapted to receive and manipulate a computer mouse and a lower surface constituting a pillow.

Lastly, it is an object of the present invention to provide a new and improved computer mouse support which includes a mouse-supporting pad in a generally rectangular configuration. The pad is formed of an upper component of a semi-rigid foam and constitutes about seventy percent of the thicknesses of the pad with an exposed upper surface adapted to receive a computer mouse and with a lower component of a soft foam secured to the lower surface of the upper component for constituting a resilient surface positionable on a user's lap or leg.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is atop elevational view of the system shown in the prior Figures.

FIG. 4 is a cross-sectional view taken along line 4—4 of FIG. 3.

Similar reference characters refer to similar parts throughout the several views of the drawings.

DESCRIPTION OF THE PREFERRED EMBODIMENT

Figure 1:
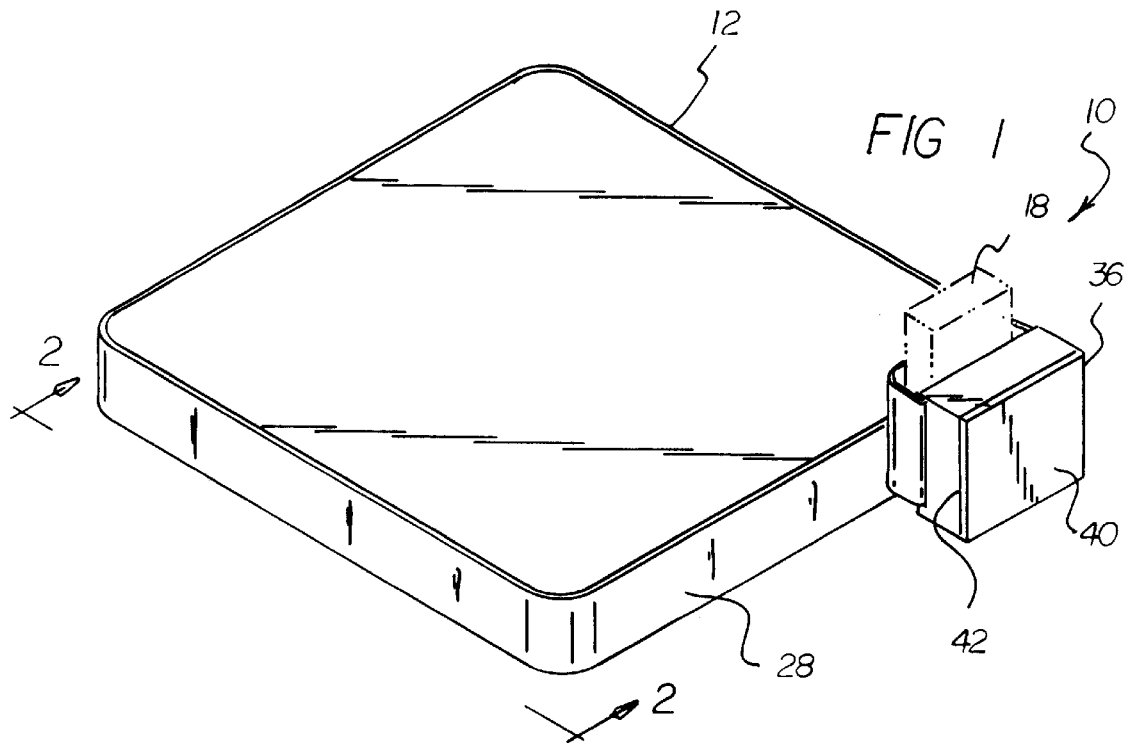
FIG. 1 is a perspective illustration of the preferred embodiment of the computer mouse support system constructed in accordance with the principles of the present invention.
Figure 2:
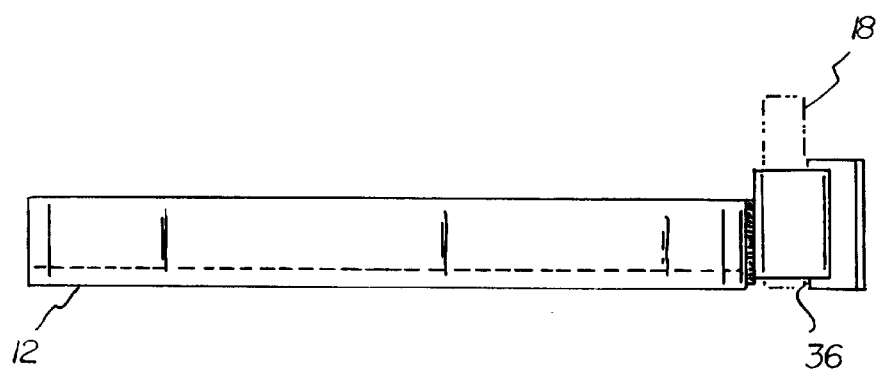
FIG. 2 is a side elevational view of the system taken along line 2—2 of FIG. 1.
Figure 5:
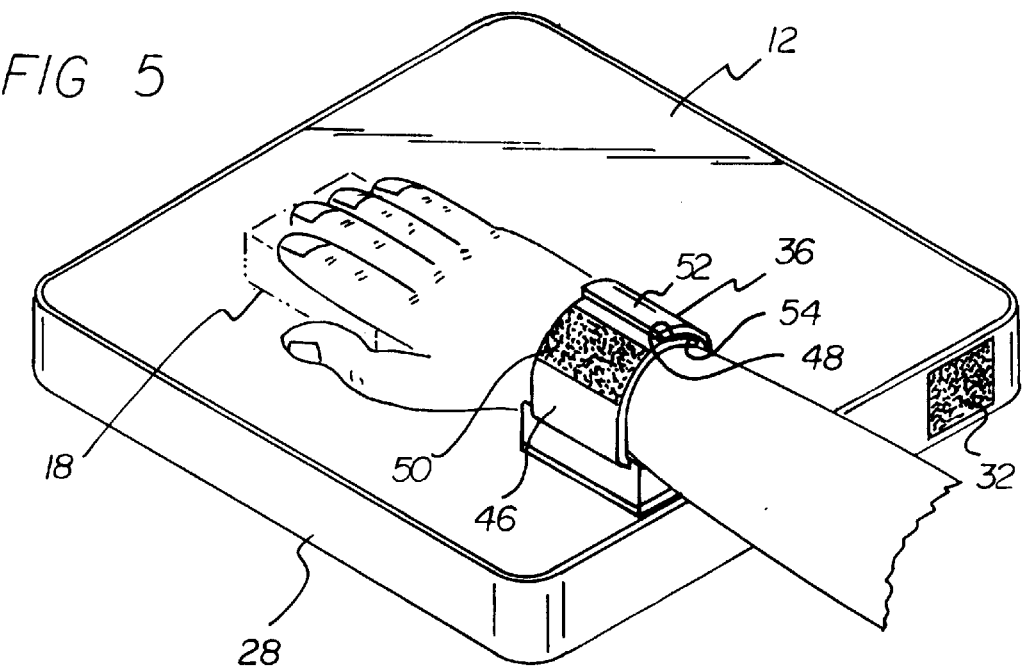
FIG. 5 is a perspective view of the system during operation and use.
Figure 6:
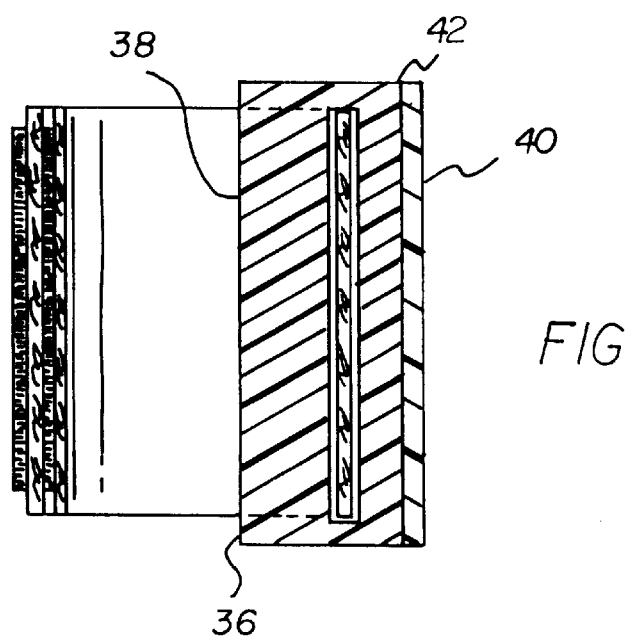
FIG. 6 a cross-sectional view taken through the mouse guard.

With reference now to the drawings, and in particular to FIG. 1 thereof, a new and improved computer mouse support system embodying the principles and concepts of the present invention and generally designated by the reference numeral 10 will be described.

The present invention, the new and improved computer mouse support system, is comprised of a plurality of components. Such components in their broadest context include a pad, a peripheral border and a wrist guard. Such components are individually configured and correlated with respect to each other so as to attain the desired objective.

More specifically, it will be noted that the new and improved computer mouse system 10 comprises, as a principal component, a mouse-supporting pad 12. Such pad is formed in a generally rectangular configuration, preferably at about sixteen inches long on each side and about two inches in thickness. The pad is formed of an upper component 14 of a semi-rigid foam and constitutes about seventy percent of the thicknesses of the pad with an exposed upper surface 16 which is adapted to receive a computer mouse 18 with or without a conventional mouse pad. The pad also has a lower component 20 of a soft foam with an upper surface which is secured to the lower surface 22 of the upper component for constituting a resilient surface 24 positionable on a user's lap or leg.

The preferred material for the upper component is Dow Four Pound Cross Link. An acceptable alternative is polylam polyethylene or any other generally rigid or semi-rigid foam material selected from the class of semirigid foams including Dow Four Pound Cross Link and polylam polyethylene. The preferred material for the lower component is polyurethane foam or any other generally soft material or soft foam material.

The system also includes a peripheral border 28. Such peripheral border is fabricated of an elastic material and is located around the periphery of the pad.

A patch 32 of a pile-type fastener is next provided. Such patch is secured to the pad adjacent one corner thereof. It may be secured to peripheral border as shown or, in the alternative, it may be secured to the upper surface of the pad, preferably at a far corner thereof.

A wrist guard 36 is next provided. Such wrist guard is shaped in a generally rectangular configuration about three inches per side and a thickness of about one inch. The preferred material for the wrist guard is polyurethane foam or any other soft foam material.

The wrist guard has an interior surface 38 positionable adjacent the carpal tunnel region of a user's wrist. It also has an exterior surface 40. A sheet 42 of a generally rigid material, preferably polyvinyl chloride, is a rectangular preferably two inches by three inches is provided across the upper surface of the pad.

The wrist guard has an elastic strap 44 secured at its ends to opposite sides of the wrist guard. Such strap is adapted to hold a user's wrist between the wrist guard and the strap during operation and use. The strap has an interior strap half 46 with an outboard patch 48 of a pile type fastener and an inbound patch 50 of a pile type fastener. The strap has an exterior strap half 52 with an inwardly facing patch 54 of a pile type fastener coupleable to a patch or the interior strap half as a function of the wrist size of a user. The wrist guard is also adapted to receive a computer mouse during non-usage with patches 50 and 52 joined with patch 48 coupled to the pile type fastener patch of the pad.

Note is taken that the elastic border 28 may be secured to the pad 12 at spaced points with such arrangement it is possible to position objects such as sleet of paper 58 or part of an electrical cord in the space between the border and pad as an extra convenience.

As described hereinabove, the system of the present invention is designed to permit an alternative to conventional "at-desk" body position when using a computer keyboard, mouse or laptop computer. It has been found that an 18 inch square cushion-pad is a comfortable size for most users, but larger or smaller lateral sizes possible. The pad is much more suitable for user comfort than a conventional cushion or any type of hard board because of the types of materials proposed for its construction.

A boon to wheelchair users and any computer operator who prefers to work with feet elevated at least part of the time, the use of the present invention would greatly reduce fatigue. The pad may be employed with the far side resting on the edge of the desk and the near side either on one's lap or a pulled-out desk drawer. With one's feet fully elevated, the pad can rest entirely on the lap.

As to the manner of usage and operation of the present invention, the same should b apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved computer mouse system comprising, in combination:
    a mouse-supporting pad in a generally rectangular configuration at about sixteen inches long on each side and about two inches in thickness, the pad being formed of an upper component of a semi-rigid foam with a common thickness throughout and constituting a majority of the extent of the thickness of the pad with an exposed upper surface adapted to receive a computer mouse with a lower component of a soft foam with a common thickness throughout secured to and covering the entire lower surface of the upper component for constituting a resilient surface positionable on a user's lap or leg, the lower component constituting a minority of the extent of the thickness of the pad;
    a peripheral border of an elastic material around the entire periphery of the pad;
    a patch of a pile-type fastener secured to the elastic material of the border adjacent one corner thereof; and
    a wrist guard in a generally rectangular configuration and a thickness of about one inch, the wrist guard having an interior surface positionable adjacent the carpal tunnel region of a user's wrist and an exterior surface with a sheet of a generally rigid polyvinyl chloride for sliding across the upper surface of the pad, the wrist guard having elastic straps secured at their ends to opposite sides of the wrist guard with a patch of a pile-type fastener on each strap remote from the wrist guard and adapted to hold a user's wrist between the wrist guard and the strap, the pile-type fastener of the straps being at a location remote from the pad for coupling with the pile-type fastener on the pad, the wrist guard adapted to receive a computer mouse during non-usage.

* * * * *